W. L. BLISS.
END CELL REGULATOR.
APPLICATION FILED MAY 9, 1907.
1,135,494.
Patented Apr. 13, 1915.
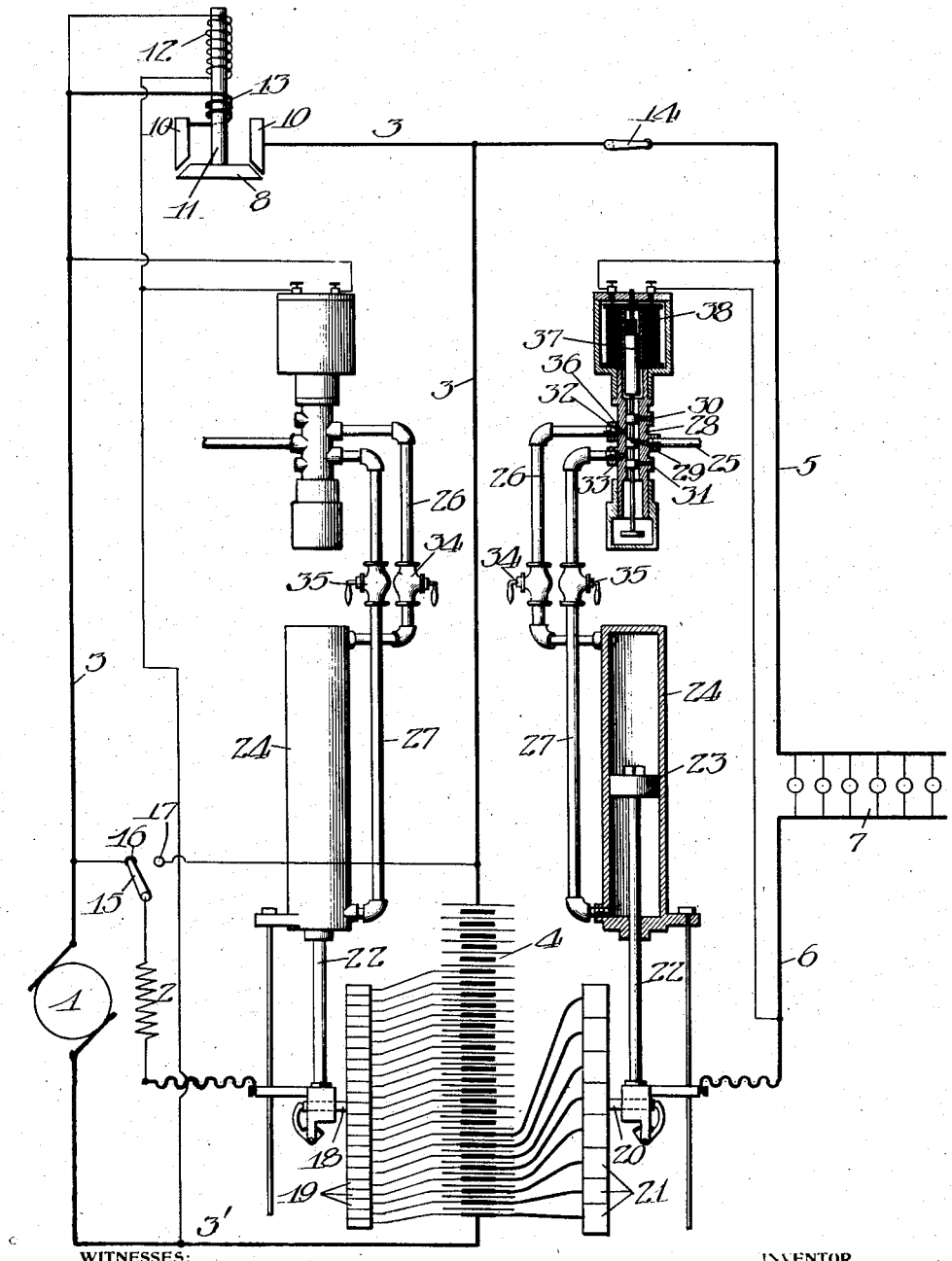

UNITED STATES PATENT OFFICE.

WILLIAM LORD BLISS, OF BROOKLYN, NEW YORK, ASSIGNOR, BY MESNE ASSIGN-
MENTS, TO CENTRAL TRUST COMPANY OF NEW YORK, A CORPORATION OF NEW
YORK.

END-CELL REGULATOR.

1,135,494.   Specification of Letters Patent.   Patented Apr. 13, 1915.

Application filed May 9, 1907. Serial No. 372,741.

*To all whom it may concern:*

Be it known that I, WILLIAM LORD BLISS, a citizen of the United States, residing at Brooklyn, in the county of Kings and State of New York, have invented new and useful Improvements in End-Cell Regulators, of which the following is a full, clear, concise, and exact description, reference being had to the accompanying drawing, forming a part of this specification.

My invention relates to systems of electrical distribution, and although it may be employed under various conditions and for various purposes, it is well adapted for use in connection with car and train lighting systems.

In order to illustrate the invention, I have chosen to describe it as embodied in a car lighting system, and the accompanying drawing shows a suitable wiring diagram for such a system, and also shows the mechanical construction of an advantageous form of electroresponsive controlling device which may be employed as part of the system.

A car lighting system of the type illustrated in the drawing is provided with two sources of electrical energy for furnishing the current to operate lamps and other translating devices, one source being a generator driven by a car axle or other means, and the other a storage battery charged by said generator. When the generator is running above a certain speed, it furnishes current to operate the translating devices and also charge the storage battery. When it is at rest or is running at a low speed, the storage battery furnishes the current to operate the translating devices. Suitable instrumentalities are provided to cause harmonious action of the elements of the system under variations in conditions.

The object of the present invention is to provide certain improvements in means for regulating the output of the generator and also in means for regulating the voltage impressed upon the translating devices.

In my system as a whole I employ two regulators, one for regulating the generator, and known as the generator regulator, and the other for regulating the voltage impressed upon the lamps or other translating devices, and known as the lamp regulator.

My invention concerns itself more particularly with improvements upon these regulators.

In the system which I have illustrated in the drawing the lamp regulator and generator regulator are of the same form. It will, of course, be understood that I may use one of these regulators without the other.

According to the preferred form of my invention the generator regulator is provided with what is known as an end cell switch which is connected in circuit in such a way that it may include more or less cells of the storage battery in the field circuit of the generator. The variation of the number of cells of the storage battery in the field circuit causes a variation in the counter electromotive force in said circuit by said battery and accordingly causes a variation in the field strength of the generator. The end cell switch is operated by a motive power device which in its preferred form is actuated by fluid pressure. The operation of the fluid pressure device is controlled by an electroresponsive device which is so connected in circuit that it is responsive to variations in electrical conditions. When the generator output tends to increase, the electroresponsive device causes the motive power device to operate the end cell switch, with the result that more cells of the storage battery are placed in the field circuit thereby reducing the field strength of the generator.

The lamp regulator, in its preferred form, is provided with an end cell switch like the generator regulator and this switch is operated by instrumentalities similar to those which are employed for operating the generator regulator.

In the system which I have shown in the drawing, I connect a number of cells of the storage battery to the end cell switch of the generator regulator and also to the end cell switch of the lamp regulator. It will thus be seen that the storage battery serves not only as means for supplying current to the translating devices but also as a medium for regulating the generator and also the lamp voltage.

Referring to the accompanying drawing, a generator is provided with an armature 1 and a shunt field coil 2. From the armature extends a main circuit 3, 3' which is divided into two parallel branches, one the battery circuit including the storage battery 4, and the other the lamp circuit 5, 6, 110 including lamps or other translating devices 7.

In order to open and close the main circuit under proper conditions, I provide an automatic switch which comprises a movable contact 8 and stationary contacts 10, said movable contact being adapted to bridge said stationary contacts. The movable contact is carried by a plunger 11, which is operated by a shunt winding 12 and a series winding 13. The shunt winding 12 is connected across the terminals of the armature, while the series winding is connected in the main circuit in series with the contacts 10. When the generator develops a predetermined voltage, the shunt winding closes the switch. A slight further increase in the speed and corresponding voltage of the generator will cause current to flow from the generator through the series winding of the automatic switch in such a direction that the series winding will now assist the shunt winding in holding the movable contact in engagement with the stationary contacts; and the greater the current in the series winding, the better will be the contact. When the generator voltage falls below that of the storage battery, the latter sends current backward through the series winding 13, thereby causing said winding to oppose the shunt winding 12 and open the switch. The lamp circuit may be controlled by means of the hand operated switch 14.

If desired, means may be provided whereby the operator may cause the generator to be separately excited. This may be accomplished by means of a hand operated switch 15 adapted to contact either of the contact points 16 or 17. Switch 15 is connected to the field coil 2; the contact 16 is connected to one of the terminals of the generator and the contact 17 is connected to one of the terminals of the storage battery. When the switch 15 is on the contact 16, current will be supplied to the field coil from the generator, whereas when said switch is upon contact 17, current will be supplied to said field coil from the storage battery. Under normal operative conditions, however, the generator will be self excited, and the switch will occupy the position shown in the diagram.

The end cell switch which constitutes a part of the generator regulator consists preferably of the brush 18, connected in series with the field coil 2, and adapted to travel over the contacts 19, which are connected to different cells in the battery 4, and are insulated from each other. The parts are so arranged that the movement of the brush 18 along the contacts 19 varies the number of cells actively in circuit with the field coil.

The lamp regulator is by preference similar to the generator regulator and consists, in addition to its operating means, of an end cell switch comprising the brush 20, connected by means of the conductor 6 to one side of the translating circuit, and adapted to travel over the contacts 21, connected to respective cells of the storage battery. The means for operating these end cell switches of the generator and the lamp regulator may be, and preferably are, alike in construction and theory of operation, and a detailed description of one of them, therefore, will be sufficient for an understanding of the complete apparatus. I wish it to be understood, however, that although I have shown both of the operating means for the end cell switches to be alike in construction, I do not wish to be understood as intimating that it is necessary that such operating means be alike in construction or principle of operation. This is a matter of convenience and design, the essential idea being that the two operating means are independently operated and controlled by electroresponsive devices.

I will now describe the switch operating and controlling devices which I have selected to illustrate this portion of my invention.

The brushes 18 and 20 hereinbefore mentioned are operated by means of piston rods 22, connected to pistons 23, which work within the cylinders 24. For convenience of description I will employ the words "upper" and "lower" with reference to the arrangement of the cylinders and their associated mechanism, but it will be understood that in actual practice these cylinders may be arranged in any convenient position, and their operation does not depend upon their being arranged in upright position.

The piston 23 is designed to be operated by fluid under pressure supplied through a pipe 25 from any suitable source of supply, such as a pressure tank or train pipe. Under the conditions which obtain in car lighting systems, it is usual to employ air as the operating medium, but it is obvious that under other conditions other fluids or a liquid might be employed with like result. The pressure medium is supplied to cylinder 24 on the upper and lower side of piston 23 by means of the pipes 26 and 27, which lead to the upper and lower extremities, respectively, of said cylinder. The flow of the pressure medium through the pipes 26 and 27 is controlled by means of a valve which also communicates with the pipe 25, and will now be described.

The valve casing 28 is provided with a main inlet port 29, connected to the source of fluid pressure supply 25. Said casing is further provided with the upper and lower exhaust ports 30 and 31, and two ports 32 and 33, which connect respectively to the pipes 26 and 27. Cocks 34 and 35 may be provided in the pipes 26 and 27 to act as hand operated reducing valves to vary the rate of flow through said pipes or the effective pressure upon the piston 23. The valve 36 is so constructed, and the several ports in the casing are so located with respect to each other, that when the valve is in a position half way between the limits of its sliding movement it will close all of the ports, or, in other words, will be "on lap". When the valve is at the limit of its downward movement, communication is established between the source of fluid supply and one side of the piston 23, and when it is at the limit of its upward movement, communication is established between said source of fluid supply and the other side of said piston; consequently the raising or lowering of valve 36 causes the raising or lowering of the piston 23, with a corresponding movement of the brush attached thereto.

The movements of the valve 36 are controlled by electroresponsive devices, which, in the present instance, are both of the same construction, each having a core 37, adapted to move within a solenoid 38. In the arrangement shown the parts are so designed that the energizing of coil 38 will raise the core 37, and impart a corresponding movement to valve 36. This in turn operates the associated brush carriers.

As above indicated, the electroresponsive device constituting part of the generator regulator is connected across the terminals of the generator 1, and is responsive to changes in the generator voltage, the parts being so proportioned and designed that when the voltage of the generator rises above a predetermined point, the number of cells in circuit in the field coil 2 will be increased, thereby increasing the counter electromotive force and consequently decreasing the field strength of the generator. The electroresponsive device which constitutes part of the lamp regulator, is connected across the translating circuit. When the voltage on the translating circuit tends to increase beyond a predetermined point, the solenoid will be energized, thus raising the valve 36, and increasing the number of cells in the translating circuit, thereby increasing the counter electromotive force in the translating circuit, with the result that proper voltage is maintained upon the lamps.

As previously stated, my system is particularly adapted for lighting cars or trains, and, therefore, in explaining the operating of my system, I shall assume certain conditions that may exist in practice.

The generator may be designed to run at 500 revolutions per minute and develop 64 volts when the train runs at 20 miles per hour. The normal voltage of the storage battery is about 64 volts. The automatic switch is adapted to close when the generator develops about 64 volts. When the train is at rest, or is running at less than 20 miles per hour, the storage battery furnishes the current to operate the lamps. When the train reaches a speed of about 20 miles per hour, the generator will develop about 64 volts, as previously stated, and then the automatic switch will close, thereby connecting the storage battery and lamps to the generator. While the generator voltage is substantially the same as the battery voltage, the generator and the battery will conjointly furnish the current to operate the lamps. When the voltage of the generator rises above that of the storage battery, the generator will not only furnish all the current to operate the lamps, but will also send current through the battery circuit to charge the storage battery. If, now, the train speed increases to, say, 60 miles per hour, the generator will be driven at 1500 revolutions per minute, and if all other conditions remained the same, would develop about 192 volts. Obviously such a voltage would be excessive for the system. It is necessary, therefore, to limit the rise in the generator voltage above the normal battery voltage, and this is accomplished by the generator regulator, which serves to vary the field strength of the generator inversely as the generator speed increases. Consequently the generator voltage is confined within safe and proper limits. In order to send the full charging current through the storage battery, it is necessary for the generator voltage to rise about 25%, and, accordingly, the proper results can be obtained by so designing the generator and the electrosensitive device that the first increase of 25% in speed above 20 miles per hour will increase the voltage 25%, that is to 80 volts, at which value the electrosensitive device will become active and so operate the valve 36 that a further increase in speed with its accompanying tendency to increase the voltage above 80 would cause the end cell switch to cut the field circuit enough battery cells to reduce the generator voltage to slightly below 80 volts. Thus the generator voltage would rapidly rise to 80 as the speed increases above 20 miles per hour, but after the voltage has reached 80, it will be prevented from increasing regardless of the further increase of speed.

It will be observed that the voltage necessary for charging the battery would be excessive for the lamps. In order to compensate for the rise in the generator voltage above the normal battery voltage, the lamp regulator serves to introduce into the lamp circuit a counter electromotive force equal to the excess of voltage impressed by the generator upon the terminals of the battery over that considered as normal lamp voltage. This is effected by cutting into the lamp circuit enough end cells to furnish the necessary counter electromotive force. The voltage impressed upon the translating circuit is, therefore, kept practically constant, notwithstanding the rise in the generator voltage.

While a voltage responsive device is best adapted for controlling the lamp regulator, as constant lamp voltage is of prime importance in any lighting system, it is not absolutely essential that a voltage responsive device be employed for controlling the generator regulator. The electroresponsive device for controlling the generator regulator might be responsive to changes in generator current as distinguished from generator voltage, in which case the electroresponsive device would be energized by the generator current and the solenoid would be wound with coarse wire and connected in series with the generator. Such a device would be so adjusted that any increase above the limit set to the current the generator should deliver would cause the electroresponsive device to respond and put into operation the generator regulator which would thereupon cause the proper reduction in generator field strength, generator voltage, and consequent generator current.

Having thus described my invention what I claim and desire to secure by Letters Patent of the United States is—

1. In combination, a generator having a field circuit, a load circuit supplied by said generator, an electroresponsive device for each circuit and a switch controlled by each device, each switch adapted to introduce a counter E. M. F. into the circuit which it controls, by varying the number of battery cells therein, the same battery serving both circuits.

2. In a system of electrical distribution, the combination of a generator having a shunt field coil, a translating circuit, a storage battery consisting of a plurality of cells arranged to have a greater or lesser number thereof oppose both the current in said shunt field coil and in said translating circuit, a plurality of end cell switches, one for controlling the field coil circuit and the other for controlling the translating circuit, and electroresponsive means for independently operating said switches.

3. In a system of electrical distribution, the combination of a generator having a shunt field coil, a translating circuit, a storage battery consisting of a plurality of cells arranged to have a greater or lesser number thereof oppose both the current in said shunt field coil and in said translating circuit, two end cell switches, one for controlling the field coil circuit and the other for controlling the translating circuit, motive power devices for controlling said switches independently, and electroresponsive means for operating said motive power devices.

4. In a system of electrical distribution, a generator, translating devices, a storage battery connected to said generator, means including an electroresponsive device and a motive power device controlled thereby for varying the number of battery cells in series with said translating devices to thereby introduce more or less counter electromotive force into circuit with them, said electroresponsive device being subject to variations in the voltage impressed upon said translating devices, a shunt field coil in circuit with said generator and means including an electroresponsive device and a motive power device controlled thereby for varying the number of battery cells in series with said field coil to thereby introduce more or less counter electromotive force into circuit with said field coil.

5. In combination, a generator, a storage battery, translating devices, said generator being adapted to supply current to said storage battery and also to said translating devices when running under certain conditions, and said storage battery being adapted to supply current to said translating devices under other conditions, a switch adapted to connect more or less cells of said battery in the field circuit of said generator to vary the counter electromotive force introduced into said circuit, a motive power device for operating said switch and an electroresponsive device adapted to respond to variations in the electrical conditions produced by said generator to control the operation of said motive power device.

6. In a system of electrical distribution, in combination, a generator, a storage battery, translating devices, a switch adapted to include more or less cells of said storage battery in circuit with the field winding of said generator to vary the counter electromotive force introduced into said circuit, a motive power device for operating said switch, an electroresponsive device adapted to respond to variations in the electrical conditions produced by said generator to vary the number of said cells in circuit, a second switch adapted to include more or less cells of said storage battery in circuit with said translating devices, a motive power device for operating the second mentioned switch, and an electroresponsive device adapted to operate the last mentioned motive power device and adapted to respond to variations in the electrical conditions in the circuit of said translating devices to vary the number of cells in circuit therewith.

7. In a system of electrical distribution, in combination, a generator, a storage battery, translating devices, said generator being adapted to supply current to operate said translating devices and also charge said storage battery under certain conditions, and said storage battery being adapted to supply current to operate said translating devices under other conditions, a switch adapted to include more or less cells of said storage battery in circuit with said translating devices to vary the counter electromotive force introduced in the circuit of said translating devices, a motive power device for operating said switch, and electroresponsive means adapted to respond to variations in electrical conditions to vary the number of said cells in circuit.

In witness whereof, I have hereunto subscribed my name in the presence of two witnesses.

WILLIAM LORD BLISS.

Witnesses:
HOWARD M. COX,
W. PERRY HAHN.